Nov. 18, 1952  J. O. EVERHART  2,618,075
APPARATUS FOR DRYING AND CONVEYING CERAMIC BODIES
Filed Oct. 31, 1949  2 SHEETS—SHEET 1
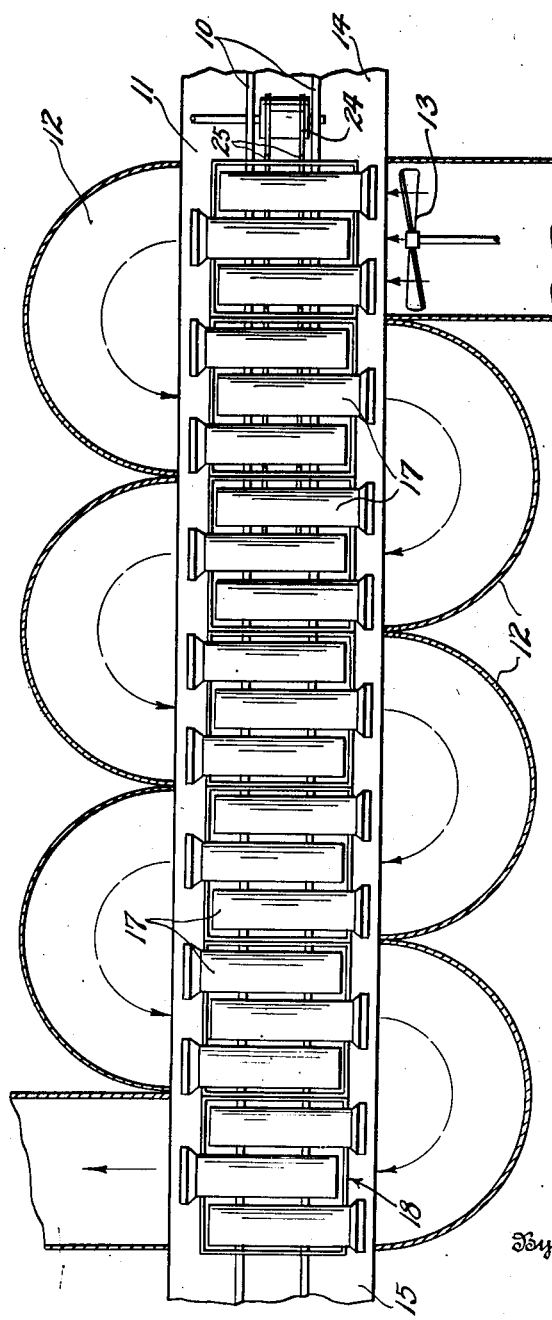
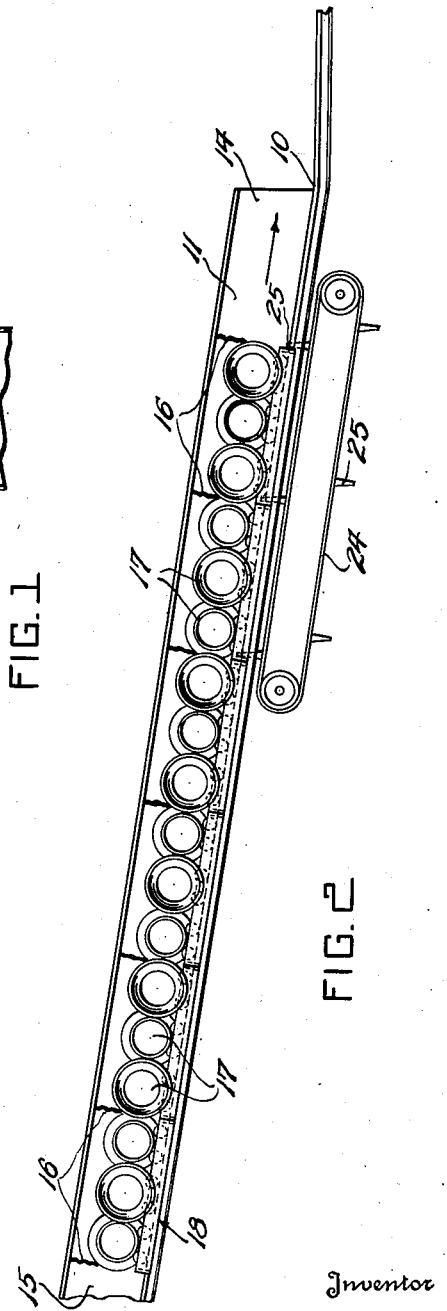
Inventor
J. O. Everhart
By W. S. McDowell
Attorney Nov. 18, 1952  J. O. EVERHART  2,618,075
APPARATUS FOR DRYING AND CONVEYING CERAMIC BODIES
Filed Oct. 31, 1949  2 SHEETS—SHEET 2
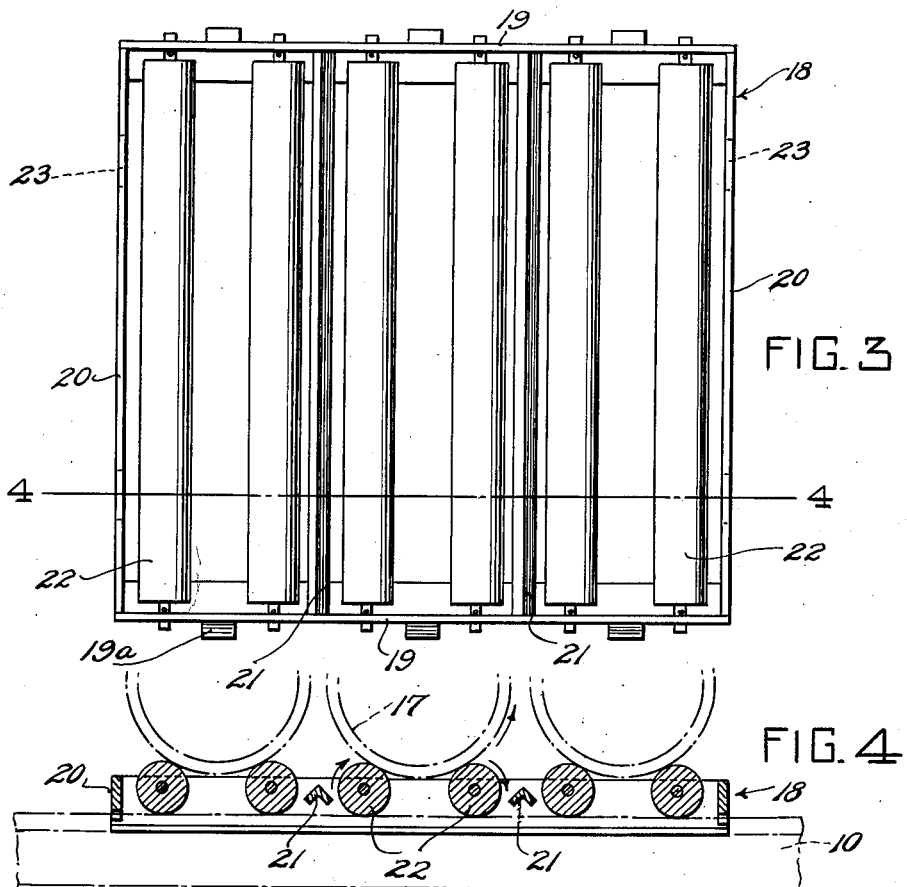
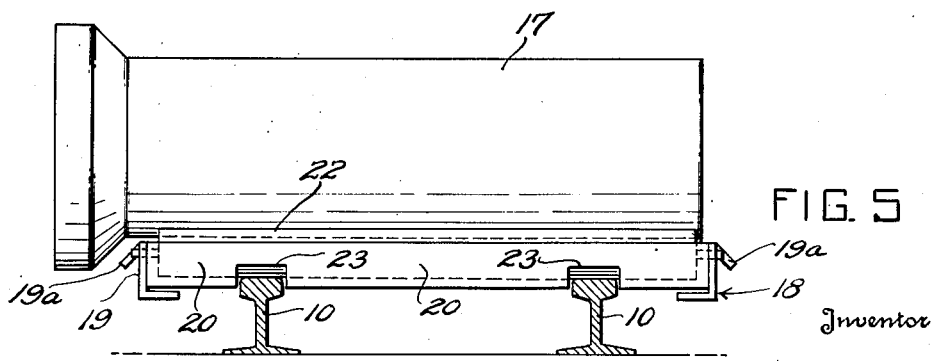
Inventor
J. O. Everhart
By W. S. McDowell
Attorney Patented Nov. 18, 1952

2,618,075

UNITED STATES PATENT OFFICE 2,618,075

APPARATUS FOR DRYING AND CONVEYING CERAMIC BODIES

John O. Everhart, Columbus, Ohio, assignor, by mesne assignments, to The National Clay Pipe Research Corporation, Logan, Ohio, a corporation of Ohio Application October 31, 1949, Serial No. 124,579

7 Claims. (Cl. 34—105)

The present invention relates generally to apparatus for drying and transporting ceramic objects, such as, for example, clay pipe sections, when the same are initially in a relatively formative state.

More particularly, the present invention deals with an improved apparatus for drying and transporting various types of ceramic articles which provides for the axial rotation of a plurality of such articles during longitudinal progression thereof through a heating or drying chamber or tunnel, whereby all surfaces of the bodies may be exposed to air circulation, preferably heated and dried, to enable the same to be dried in a uniform and even manner preventing distortion or warpage of the bodies, while at the same time being transported, for example, from a molding station to a firing kiln.

In the past, various types of apparatus and machines have been proposed for this general purpose, such apparatus generally comprising continuous chains or belt members having mounted transversely thereof spaced parallel cradles or rolls upon which substantially cylindrical ceramic articles might be supported to be conducted longitudinally through a drying zone. The prior art discloses the use of continuous chain conveyors, having cradle rolls extending transversely thereof, which rolls are driven for axial rotation by means of suitable gearing devices, in order that the individual pipe sections supported on the rolls might be rotated during longitudinal progression in conjunction with a conveyor. It is also known that one type of apparatus proposed for use in accomplishing the drying and truing up of cylindrical pipe sections comprises a plurality of spaced parallel bed rolls carried within a stationary frame and adapted to receive a plurality of pipe sections for rotation simultaneously with the passage or circulation of air or drying gases through and across the individual pipe sections. For reference to this latter construction, attention is invited to United States Patent No. 2,248,490 to Chamberlain et al., dated July 8, 1941.

The primary objections to previous apparatus of the character outlined arose through their failure either to provide for the reception of bell-ended pipe sections or to provide for the simultaneous movement of the pipe sections longitudinally through a drying atmosphere while causing the axial rotation of such sections, in order to expose all surfaces thereof to the drying atmosphere.

Accordingly, it is one of the primary objects of the present invention to provide an apparatus which is adapted to support a plurality of ceramic pipe sections of the bell-end type when the latter are in a formative state, while at the same time providing for the axial rotation of such sections and the longitudinal progression thereof through a drying chamber or zone.

It is another object of this invention to provide a combination drying and conveying apparatus for initially formative ceramic bodies which comprises a system of spaced parallel tracks leading through a zone of forced air circulation, and a plurality of supporting racks arranged above the track system for longitudinal movement thereover, with each rack comprising a substantially rectangular frame in which is journaled a plurality of spaced parallel cylindrical rolls which project above the plane of the rack in a manner to support the ceramic bodies in relatively elevated positions upon the rolls with the under surfaces of the rolls engaging the track system in a manner to provide axial rotation of the rolls and of the ceramic bodies supported thereon upon longitudinal movement of the frames over the track system.

Still a further object of the present invention is to provide an apparatus for conveying and drying ceramic objects which comprises a plurality of disconnected rack units which may be placed upon a track system to be motivated longitudinally thereof either by means of gravitational forces or by means of a relatively small short-run conveyor, and wherein the individual article-supporting racks are in no way connected to one another or to the track system whereby the same may be readily removed from the conveyor line and returned to the charging end of the track system manually or independently of any conveyor mechanism associated with the drying and conveying apparatus.

Yet a further object of the present invention is to provide a drying and conveying system for ceramic ware which comprises a downwardly inclined track system and a plurality of ware-supporting racks which are movable over the track system by gravity to simultaneously conduct and axially rotate a plurality of ceramic objects while passing through a drying zone.

These and additional objects and advantages of the present invention will become more apparent by reference to the following description and the appended drawings, wherein:

Fig. 1 is a horizontal sectional view taken through a drying tunnel, and disclosing in top plan a pipe-supporting and conveying system formed in accordance with the present invention;

Fig. 2 is a diagrammatic longitudinal vertical sectional view taken through the drying tunnel and disclosing the conveying system in side elevation;

Fig. 3 is a top plan view of a pipe-supporting rack formed in accordance with the present invention;

Fig. 4 is a vertical sectional view taken along the line 4—4 of Fig. 3; and

Fig. 5 is an end elevational view of a pipe-supporting rack positioned upon a track system and supporting a bell-ended pipe section.

Referring now to the drawings, it will be seen that the present invention makes use of a system of spaced parallel tracks 10 which are preferably arranged to extend between a molding or forming station, not shown, and a discharge station, preferably disposed adjacent a firing kiln or other heat-treating station, also not shown.

As shown in Fig. 2, the track system may be disposed on a slight downward incline. The tracks 10 pass through a relatively elongated drying chamber or tunnel 11 which is defined on its sides by a plurality of adjoining arcuate chambers 12, adapted, by nature of their shapes and arrangement, to recirculate a forced air stream under influence of one or more power driven blowers 13 transversely back and forth across the drying tunnel 11 throughout its length.

It will be understood that the chamber or tunnel 11 is closed at its upper and lower ends while being open at its discharge end 14 and at its inlet end 15, and may be constructed to accommodate one or a plurality of parallel track systems. Disposed transversely of the tunnel or chamber 11 are a plurality of flexible dividing screens 16 which depend from the upper wall of the tunnel, and which divide the same into a plurality of separate chambers which interconnect with one another at their ends by way of the arcuate housings 12 defining the side walls of the tunnel. The dividing screens 16 enable forced air to pass transversely across the tunnel 11 in one direction, and thereafter to be reversed in direction by nature of the housings 12 and thence to pass transversely across the tunnel in the opposite direction. Thus, pipe sections positioned transversely of the tunnel are subjected to forced air circulation which passes first in one transverse direction and then in the opposite transverse direction across and through the individual pipe sections as they advance longitudinally through the tunnel.

As shown in Figs. 1 and 2, a plurality of pipe sections 17 are adapted for being directed longitudinally through the drying chamber or tunnel 11, while at the same time being axially rotated, by means of a series of substantially rectangular pipe-supporting racks 18. Each of the racks comprises a rectangular frame which is formed with spaced parallel side and end members 19 and 20 respectively. The racks 18 are substantially flat and are reinforced by means of a plurality of transversely extending angle bars 21 which are secured at their respective ends to the side members 19 of the frame, as by welding or other suitable means. Disposed transversely of each of the frames are a plurality of spaced parallel cylindrical rolls 22. The rolls 22 are arranged in pairs and are adapted to support a pipe section substantially coextensively throughout its body region, as shown in Fig. 5. When operating upon bell-ended pipe sections, as shown in the drawings, the bell ends of the pipe sections are unsupported and freely overhang an end of each pair of rolls and a side member of the frame. As seen in Fig. 4, the rolls 22 project above the level of the side members of the frame in a manner to support the body portion of a pipe section in relatively elevated relation to the frame, whereby to provide ample clearance between the frame and the body portion of the pipe section in order to eliminate scraping therebetween during rotation of the pipe sections. Additionally, a plurality of beveled wear plates or buffers 19a may be positioned upon the sides 19 of the frame to prevent the bell portions of the pipes from contacting the sharp edges of the frame in the event that the pipe sections are displaced transversely of the frame during rotation thereof.

The end members 20 of the frames are provided with transversely spaced and longitudinally aligned slots 23 through which the ball portions of the track rails may pass to engage with the under surface of the individual rolls 22. Thus, upon longitudinal movement of the frames 18 over the tracks 10, the individual rolls 22 are axially rotated which, in turn, imparts axial rotation to the individual pipe sections which are cradled between adjacent rolls. It will be understood that in the event that the diameter of the rolls 22 is substantially greater than the thickness of the frame, the lower portions of the rolls will extend well below the level of the frame, and in such case the slots 23 may be eliminated and other guide means may be employed to prevent transverse movement of the racks upon the track system.

As previously stated, the track system 10 is preferably disposed on a downward incline; however, the same may be arranged in upwardly inclined or horizontal planes, in which event the frames may be moved longitudinally through the chamber or tunnel 11 by means of a short-run continuous conveyor belt or chain disposed below the inlet end of the track system, and engageable with the end members 18 of the frame to advance the same longitudinally of the track system. In such an alternative construction, the use of relatively expensive elongated conveyor chains or belts is eliminated and the short-run drive chain is positioned so as to engage one, or at most two, of the racks or frames at the inlet end of the track system. Thus, the last rack or frame on the track system serves to shove or push an adjacent abutting frame, and thereby all frames, in advance of the last frame longitudinally over the tracks. It will be understood that the racks or frames are placed upon the track system in a continuous operation, whereby the track system is substantially full at all times during operation of the drying apparatus.

With a downwardly inclined track system, as shown in Fig. 2, a speed-controlling chain or belt 24 is positioned at the discharge end of the track system, and instead of acting as a means for advancing the individual frames through the chamber, functions to regulate the speed at which said frames travel through the tunnel, and in actual practice, retards the rate of movement of successive and abutting frames through the drying zone. Advantageously, the chain 24 may be provided with outwardly projecting lugs 25 spaced so as to engage an end member of one or more racks located at the discharge end of the track system. Preferably, the rate of movement of the individual racks longitudinally of the tracks is such as to provide for a relatively slow rate of rotation of the individual pipe sections which are supported upon the rolls 22. The speed of rotation of the pipe sections preferably ranges from ⅛ revolution per minute to 3 revolutions per minute. The passage of the pipe sections through the drying zone is relatively slow, in order that the pipe sections may be subjected to prolonged forced air circulation in order to completely dry the same between the inlet and discharge ends of the drying tunnel.

It will be understood that as the pipe sections are initially received at the inlet end of the drying tunnel, the same are relatively moist and in a formative state, having just been received from a molding or forming apparatus. Hence, by reference to Fig. 1, it will be seen that the pipe sections disposed toward the intake end of the tunnel 11 will be subjected to a transverse circulation of forced air which, preferably, will be relatively cool and moist due to the fact that such air has previously circulated back and forth through a number of pipe sections prior to striking the sections disposed at the intake end of the tunnel or chamber. Preferably, the air forced by the blower 13 is heated by any suitable means in order that the pipe sections which have progressed toward the discharge end of the drying zone may be subjected to relatively dry and warm air which, during its circulation through the longitudinal length of the tunnel, is progressively cooled and humidified in order that drying may be very gradual at the intake end of the drying tunnel. However, if desired, the single blower 13 may be supplemented by one or more blowers disposed at spaced intervals throughout the length of the drying zone. Also, heated air may be introduced to the drying tunnel or chamber at various positions along the length of the tunnel, rather than depending upon a single source as outlined in the drawings.

Preferably, the individual pipe sections are carried transversely upon the rolls 22 with the bell ends of the sections alternately overhanging opposite sides of the frame. Thus, the possibility of engagement between the individual pipe sections during rotation and longitudinal advancement thereof through the drying zone is eliminated, while at the same time accommodating a maximum number of pipe sections upon the individual frames. It will be understood, however, that the pipe sections may be positioned so as to have all the bells overhanging the same side of the racks simply by controlling the spacing of the sets of rolls in accordance with the diameter of the bells of the pipe sections. In instances where a mechanical charging device is employed to load the pipe sections upon the rolls, the spacing of the rolls should be such as to permit the bell ends of all pipe sections to overhang the same side of the racks.

It should also be noted that the relatively enlarged bell ends of the pipe sections overhang the sides of the frames and are entirely unsupported by nature of the fact that the individual cradle rolls are unobstructed at their ends, the same being rotated by movement over the tracks 10, while the individual racks are controlled in their movement by means of the short-run chain or conveyor which engages the frames at their under sides. Thus, the use of relatively long spaced parallel chains is eliminated, and by nature of the fact that the individual racks or frames may be easily detached from the track system after discharge from the drying zone, the same may be quickly and easily returned to the forming or molding station to be replaced upon the tracks at their intake end. Thus, the pipe-supporting medium of the system is not limited in its use by the movement of an associated conveyor which must necessarily travel at a relatively low speed due to the time required for drying, thus tying up at least one-half of the number of supports available in the case of a continuous belt or chain type of conveyor having a return run travelling below the entire length of the drying chamber.

While particular provision has been made in the present apparatus to accommodate bell-ended pipe sections, it should be understood that the present improved drying and conveying system may, with equal facility, accommodate purely cylindrical pipe sections devoid of enlarged bells as well as other tubular or solid ceramic bodies, and that the cross-sectional configuration of such bodies need not be purely circular or annular, as hexagonal, octagonal or other multi-angular cross-sectional bodies may be positioned and rotated upon the rolls of the individual racks. Toward this end, the spirit and scope of the present invention should in no way be limited, except as defined by the following claims.

I claim:

1. Apparatus for drying formative ceramic bodies comprising an elongated track-forming surface; a plurality of abutting but disconnected relatively flat rectangular frames having mounted transversely therein a plurality of axially rotatable spaced parallel rolls having their under sides in engagement with said track-forming surface and being rotatable in response to movement of said frames longitudinally over said surface, said rolls having their upper sides disposed above said frames to provide relatively elevated cradle beds between adjacent rolls for the reception of a body to be dried, and to provide for the overhanging of an end of a body positioned transversely between a pair of such rolls, said rolls beyond one side of said frames being operable upon movement of said frames over said track surface to impart rotation to a body positioned thereon; means on said frames to prevent transverse displacement thereof with respect to said track-forming surface during longitudinal movement of said frames over said surface; and means engageable with at least one of said frames for controlling the speed of movement of all of said frames over said track surface.

2. Apparatus for simultaneously drying and conveying cylindrical ceramic pipe sections of the type having an enlarged bell end, comprising a plurality of spaced parallel tracks, a plurality of disconnected but abutting rectangular frame members arranged for movement longitudinally of said tracks, each of said frame members having spaced parallel side and end members and a plurality of spaced parallel cylindrical rolls carried transversely of said frame members for axial rotation, said rolls being arranged to project above the level of the side members of said frame members and providing for the support of a pipe section throughout its body portion between two of such rolls transversely and in a relatively elevated position with respect to the frame member with the bell end of the pipe section freely overhanging one end of said rolls and a side of the frame member, said frame members being formed with longitudinally aligned slots in the end members thereof for the reception of said tracks and providing for direct engagement of the under side of said rolls with said tracks, whereby rotation may be imparted to the individual rolls of said frame members and to pipe sections positioned thereon upon longitudinal movement of said frame members over said tracks; and means engageable with at least one of said frame members for controlling the rate of movement of all of said frame members over said tracks.

3. Apparatus for simultaneously drying and conveying cylindrical ceramic pipe sections of the bell end type when received in a formative state; comprising a pair of spaced parallel tracks; a plurality of longitudinally abutting disconnected frames positioned above and movable longitudinally of said tracks, each of said frames having a width greater than the spacing between said tracks and being provided with a plurality of axially rotatable spaced parallel rolls extending transversely thereof, said rolls having their upper runs disposed above the level of said frames for supporting pipe sections in relatively elevated positions above said frames with the bell ends thereof overhanging a side of the frames and their lower runs disposed in engagement with said tracks, whereby rotational movement may be imparted to said rolls and to pipe sections supported thereon during longitudinal movement of said frames over said tracks; guide means for preventing displacement of said frame transversely of said tracks during movement of said frames longitudinally of said tracks; and means disposed at one end of said tracks and engageable with at least one of said plurality of frames for controlling the speed of movement of said frames over said tracks and the speed of rotation of pipe sections supported on said rolls.

4. In a drier-conveyor for cylindrical ceramic pipe sections having bell ends; a plurality of parallel tracks; and a pipe-supporting rack for longitudinal movement over said tracks comprising a rectangular frame formed with spaced parallel side and end members, and a plurality of spaced parallel cylindrical rolls rotatably carried between the side members of said frame and extending transversely across said rack, said rolls having longitudinally coextensive upper surfaces disposed above the level of said frame and providing a cradle support for the body portion of a pipe section positioned transversely of said frame between a pair of said rolls with the bell end of the pipe section projecting outwardly beyond the ends of said rolls and being unsupported, said rolls at their under surfaces being engageable with said tracks and rotatable upon longitudinal movement of said rack thereover for imparting axial rotation to a pipe section cradled between a pair of said rolls.

5. Apparatus for simultaneously drying and conveying formative ceramic bodies comprising a downwardly inclined track system; a tunnel covering at least a part of said track system; a plurality of disconnected but longitudinally abutting rectangular racks each having a plurality of spaced parallel cradle rolls mounted transversely therein for axial rotation and being movable longitudinally over said track system, said rolls being arranged to extend above said racks and to receive and support a plurality of ceramic bodies between adjacent pairs of said rolls, said rolls having their under sides engaging said track system whereby to be rotated upon longitudinal movement of said racks over said track system; means for preventing transverse displacement of said racks relative to said track system during longitudinal movement of said racks thereover; means communicating with said tunnel for forcing air transversely thereof; and means disposed at one end of said track system and engageable with at least one of said racks for controlling the movement of all of said plurality of racks over said track system.

6. In a drying and conveying system for formative ceramic bodies including a plurality of spaced parallel tracks; a portable rack device for supporting and transporting said bodies longitudinally over said tracks, comprising a rectangular frame embodying a pair of spaced parallel side members, and a plurality of spaced parallel cylindrical rolls extending transversely of said frame and mounted in the side members for axial rotation, said rolls having one side extending beneath said frame for rolling engagement with the tracks of said system when said rack is positioned thereon and opposite sides projecting above said frame and providing between a pair of said rolls a relatively elevated cradle support for the rotative reception of a ceramic body, said rolls when positioned upon said tracks providing for the longitudinal movement of said rack over said tracks and the simultaneous rotation of a ceramic body positioned upon a pair of said rolls.

7. In a drying and conveying system for formative ceramic bodies including a plurality of spaced parallel tracks; a portable rack device for supporting and transporting said bodies longitudinally over said tracks, comprising a rectangular frame embodying a pair of spaced parallel side members, and a plurality of spaced parallel cylindrical rolls extending transversely of said frame and mounted in the side members for axial rotation, said rolls having one side extending beneath said frame for rolling engagement with the tracks of said system when said rack is positioned thereon and opposite sides projecting above said frame and providing between a pair of said rolls a relatively elevated cradle support for the rotative reception of a ceramic body, said rolls when positioned upon said tracks providing for the longitudinal movement of said rack over said tracks and the simultaneous rotation of a ceramic body positioned upon a pair of said rolls, the side members of said frame having an upper surface disposed below the upper sides of said rolls to permit the overhanging of an end of a ceramic body positioned upon a pair of said rolls beyond said rolls and the sides of said frame.

JOHN O. EVERHART.

REFERENCES CITED

The following references are of record in the file of this patent:

UNITED STATES PATENTS

| Number | Name | Date |
|---|---|---|
| Re. 14,528 | Andrews | Oct. 8, 1918 |
| 288,213 | Dann | Nov. 13, 1883 |
| 2,481,130 | Lindemuth | Sept. 6, 1949 |